United States Patent [19]
Green

[11] Patent Number: 5,928,084
[45] Date of Patent: *Jul. 27, 1999

[54] TOOLS FOR PRODUCING THREADS WITH VARYING PITCH

[76] Inventor: William P. Green, 3570 E. Lombardy Rd., Pasadena, Calif. 91107

[*] Notice: This patent is subject to a terminal disclaimer.

[21] Appl. No.: 08/188,882

[22] Filed: Jan. 31, 1994

Related U.S. Application Data

[63] Continuation-in-part of application No. 07/904,499, Jun. 25, 1992, Pat. No. 5,316,520.

[51] Int. Cl.$^6$ ........................................ B21J 13/02
[52] U.S. Cl. .............................. 470/198; 470/96
[58] Field of Search ..................... 470/10, 18, 19, 470/87, 96, 97, 98, 101, 103, 104, 105, 198, 199; 408/222; 409/65; 11/70

[56] References Cited

U.S. PATENT DOCUMENTS

| | | | |
|---|---|---|---|
| 1,210,508 | 1/1917 | Marye | 470/198 |
| 2,787,798 | 4/1957 | Rosan | 470/204 |
| 3,021,538 | 2/1962 | Linley, Jr. | 470/198 |
| 4,389,145 | 6/1983 | Capuano | 470/18 |
| 4,396,321 | 8/1983 | Holmes | 470/198 |
| 4,956,888 | 9/1990 | Green | 470/19 |
| 5,086,532 | 2/1992 | Green | 470/18 |
| 5,112,168 | 5/1992 | Glimpel | 470/198 |
| 5,250,007 | 10/1993 | Green | 470/96 |
| 5,316,520 | 5/1994 | Green | 470/96 |
| 5,318,393 | 6/1994 | Yamada | 408/222 |

OTHER PUBLICATIONS

"Tool Engineers Handbook—2nd Edition" by ASTME Publications Committee published 1959, pp. 46–1 to 46–41.

*Primary Examiner*—Joseph J. Hail, III
*Assistant Examiner*—Ed Tolan
*Attorney, Agent, or Firm*—William P. Green

[57] ABSTRACT

Apparatus for forming threads of varying pitch on a work piece, by first producing a partial thread and groove whose pitch does not vary in accordance with a pattern of pitch variation desired for the final product, and then reshaping the partial thread and groove to a final form whose pitch does vary in accordance with the desired pattern. The two steps may be performed by a single tool having a series of thread cutting projections which form the partial thread, and having one or two additional projections which then reshape the partial thread to its final form.

23 Claims, 6 Drawing Sheets

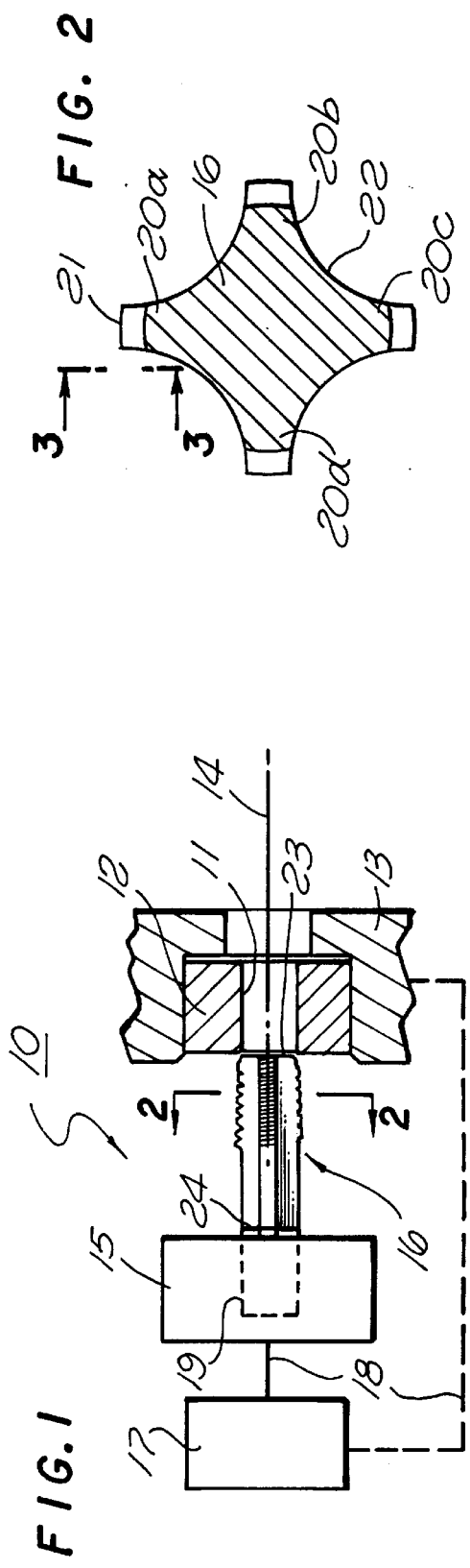
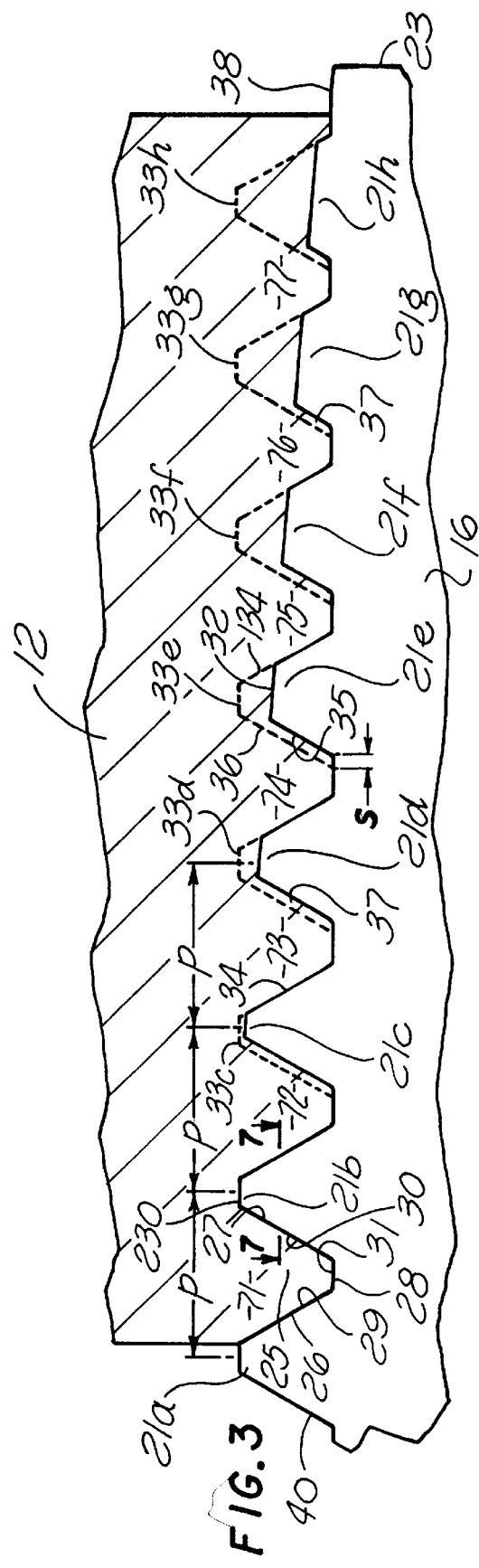

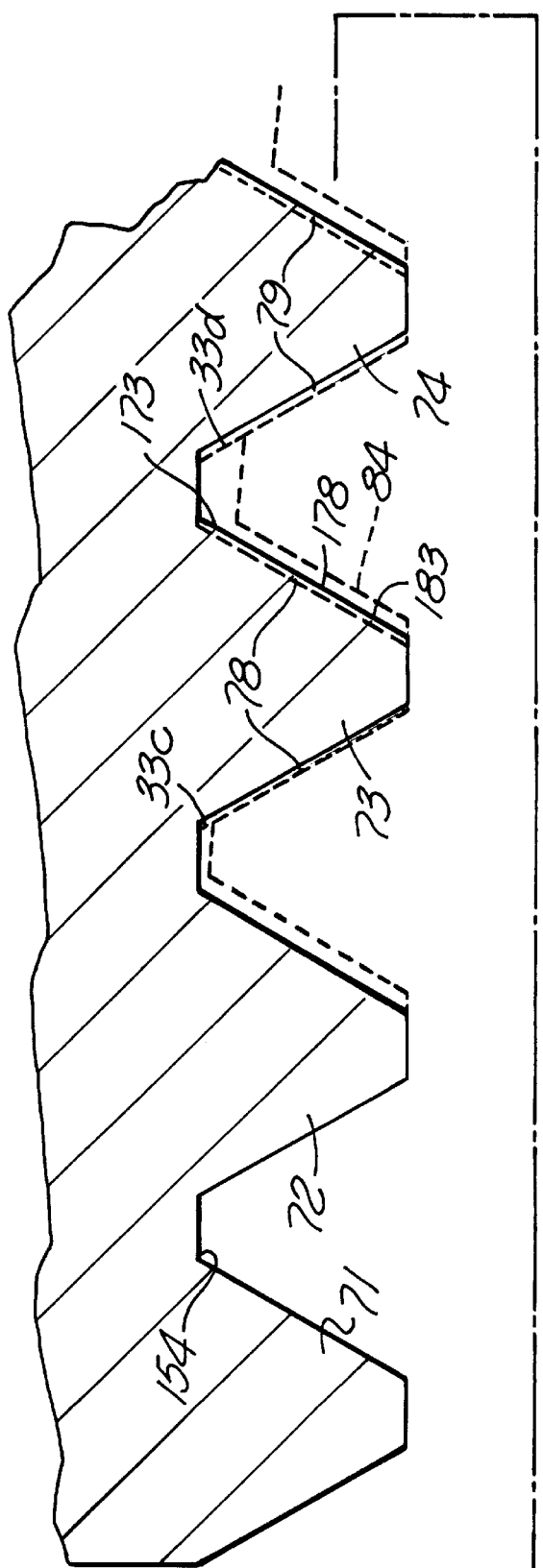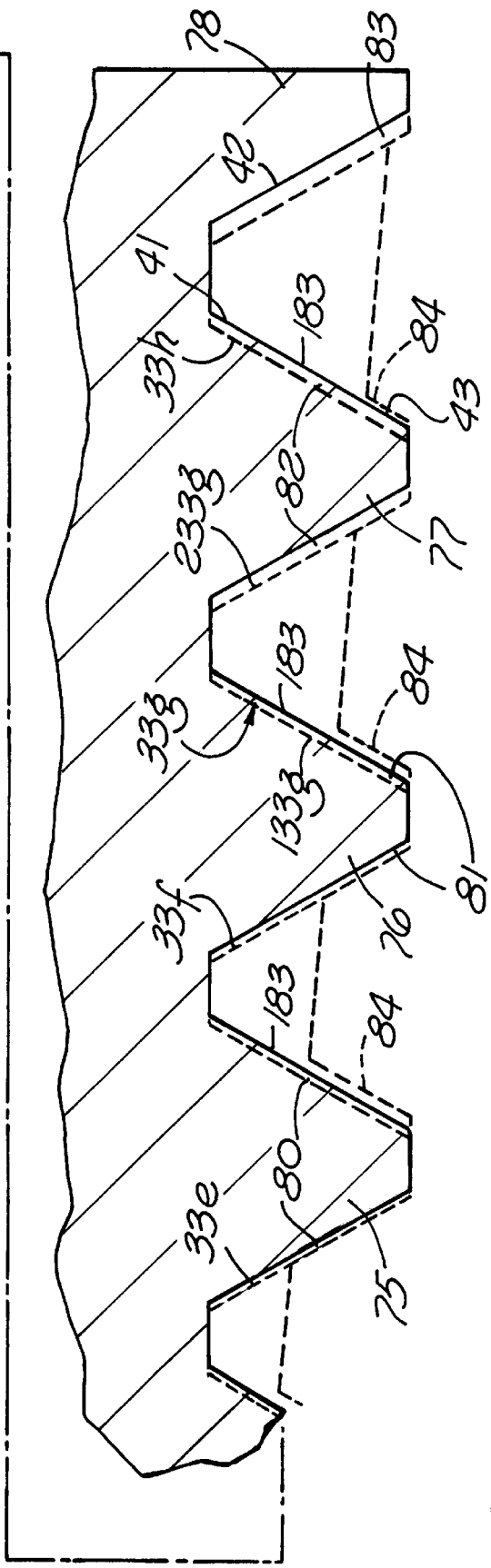
FIG. 4

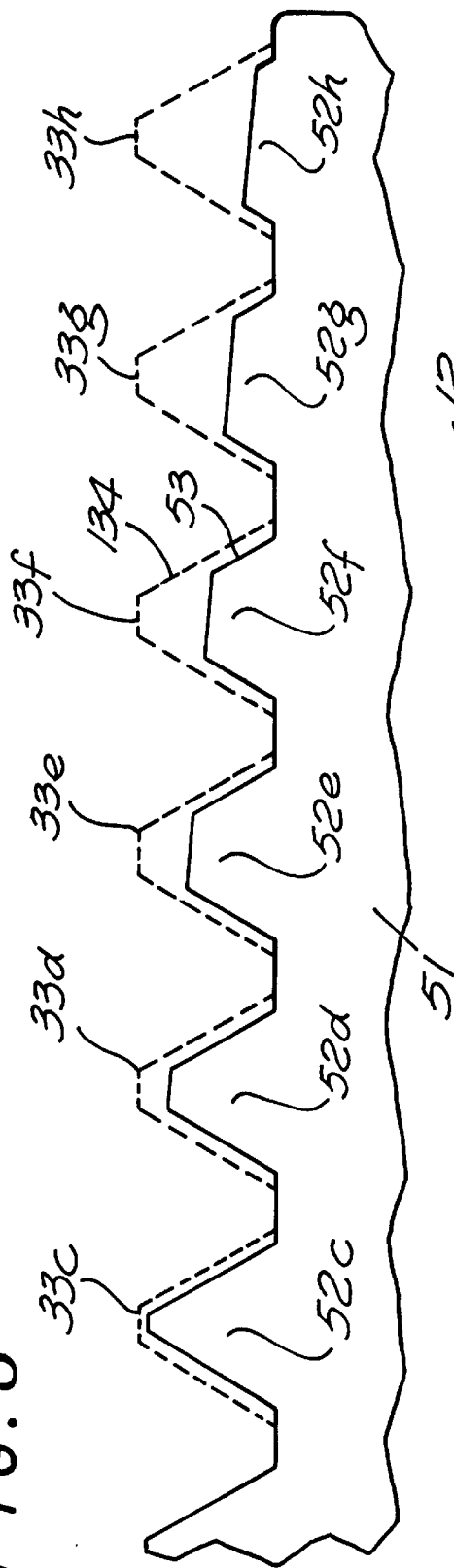
FIG. 8
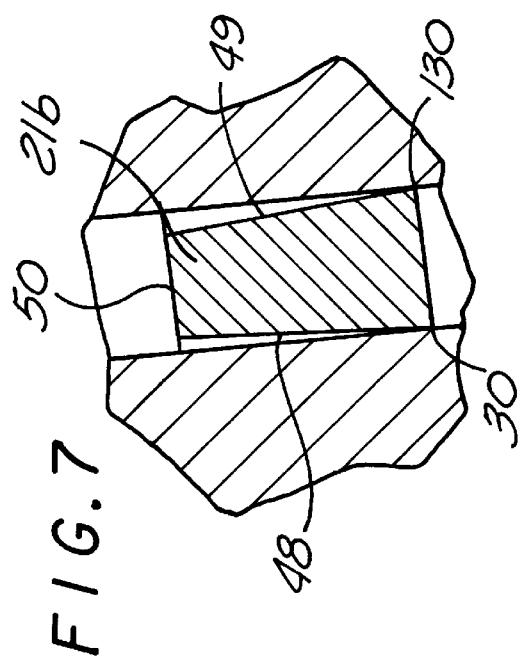
FIG. 9
FIG. 7

5,928,084

TOOLS FOR PRODUCING THREADS WITH VARYING PITCH

This application is a continuation-in-part of U.S. patent application Ser. No. 7/904,499 filed Jun. 25, 1992, now U.S. Pat. No. 5,316,520 on "Formation of Threads With Varying Pitch".

This invention relates to methods and apparatus for forming threads of varying pitch in a work piece, and for producing a tool to form such threads.

BACKGROUND OF THE INVENTION

U.S. Pat. Nos. 4,842,464, 4,956,888 and 5,086,532 disclose a novel type of nut having a thread of varying pitch which acts to distribute the axial load applied to the nut more uniformly between the different turns of the thread than is possible with a conventional thread whose pitch does not vary. These patents show methods and apparatus for manufacturing such nuts by employment of lathe type threading tools having a single point which takes a series of cuts in the work piece, or a similar tool having two projections for simultaneously forming opposite side surfaces of the thread. U.S. patent application Ser. No. 7/783,429 filed Oct. 28, 1991 on "Methods And Apparatus For Forming Threads With Variable Pitch" shows another method of forming a thread of varying pitch, utilizing a threading assembly consisting of several thread forming elements which rotate and advance axially relative to the work piece essentially in unison, and which also shift axially relative to one another during a threading operation in a manner producing together the desired thread of varying pitch.

SUMMARY OF THE INVENTION

The present invention provides improved tools for forming a thread of varying pitch of the above discussed type, or any other internal or external thread having a varying pitch, in a simpler and less expensive manner than in the prior patents and application. Tools embodying the invention can produce a thread of varying pitch by a process approximately as simple and inexpensive as the usual tapping or die cutting operation for producing threads of uniform pitch. The tools of the invention are also essentially as versatile as conventional taps and dies with respect to the diameter of thread which may be produced. A tool constructed in accordance with the invention can produce threads down to very small sizes not possible with single point type tools.

In producing a thread with a tool of the present invention, the thread is first partially pre-formed to a configuration which does not have the precise varying pitch characteristics desired in the ultimate thread, and which may be of uniform rather than varying pitch, after which a final shaping operation gives the flank surfaces at opposite sides of the thread, and a groove between successive turns of the thread, their varying pitch. The two steps may be performed by a single tool having a first pre-forming portion with threading projections of progressively increasing size for first partially pre-forming the thread groove, and having also a final shaping portion which engages the work piece after initial formation of the groove and gives the thread its final shape. The pre-forming portion of the tool, and all of its projections, are dimensioned in a manner avoiding enlargement of the groove by the pre-forming portion beyond the axial sectional profile of the groove of varying pitch ultimately to be formed by the final shaping portion of the tool. During relative rotary and axial advancement of the tool and work piece in performing a threading operation, the elements may first be advanced axially at a uniform rate per revolution during the pre-forming stages of the operation, and then be advanced at a varying rate per revolution during the final precise shaping portion of the process. In another form of the invention, the tool and work piece may be advanced at a varying rate throughout the threading operation. Another process which attains some but not all of the advantages of the invention involves use of separate pre-forming and final shaping tools which sequentially engage and act on the work piece.

BRIEF DESCRIPTION OF THE DRAWINGS

The above and other features and objects of the invention will be better understood from the following detailed description of the typical embodiments illustrated in the accompanying drawings, in which:

FIG. 1 is a diagrammatic representation of apparatus embodying the invention for producing an internal thread of progressively increasing pitch within a nut body;

FIG. 2 is an enlarged transverse section through the tapping tool of FIG. 1, taken on line 2—2 of that figure;

FIG. 3 is a greatly enlarged view taken on line 3—3 of FIG. 2, with the tapping tool shown after it has advanced into the nut body;

FIG. 4 is a view similar to FIG. 3, but showing the thread in the nut body after the tapping tool has moved entirely through the nut body and the thread of increasing pitch has been completely formed;

FIG. 7 is an enlarged fragmentary section taken on line 7—7 of FIG. 3;

FIG. 8 is a fragmentary view similar to FIG. 3, and showing a variational form of threading tool;

FIG. 9 is an enlarged diagrammatic view showing the cuts made in the right hand thread groove of FIG. 8 during the first portion of a threading operation utilizing the tool of FIG. 8;

DESCRIPTION OF THE PREFERRED EMBODIMENTS

Figure 5:
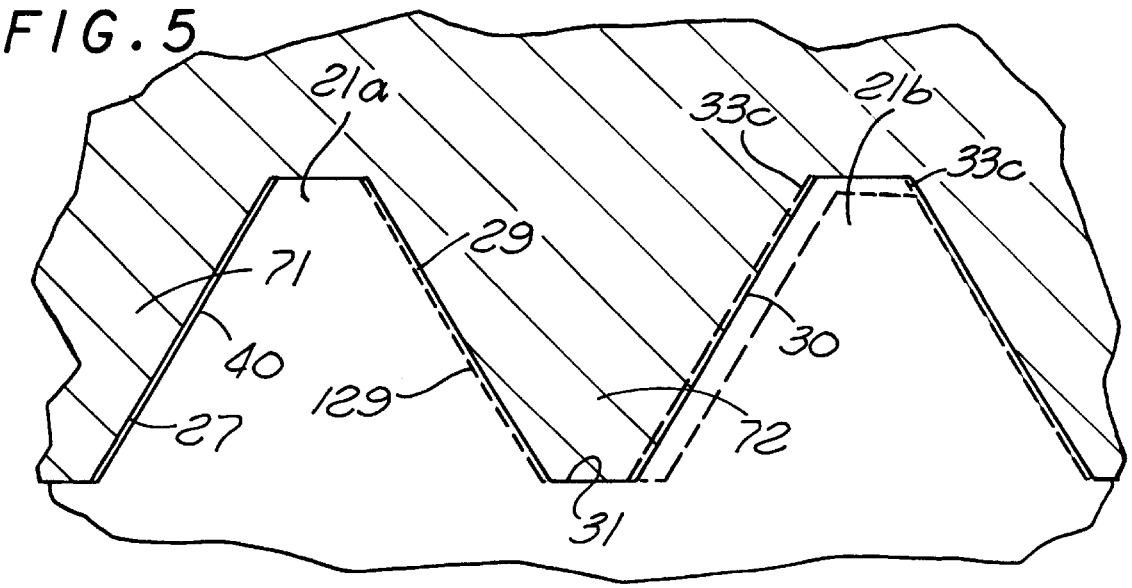
FIG. 5 is an enlarged fragmentary view corresponding to the left hand portion of FIG. 3, but with the tapping tool illustrated as it appears after it has been advanced rightwardly one full turn beyond the position of FIG. 3.

FIG. 1 illustrates diagrammatically at 10 apparatus for forming an internal thread of progressively increasing pitch within a cylindrical bore 11 in a nut body 12. The thread is produced by moving the nut body and a threading tool 16 embodying the invention both rotatively and axially relative to one another in timed relation. Any type of lathe, threading machine, screw machine or other machine tool capable of producing such relative movement may be employed. For example, the nut body may be held by a chuck 13 of a lathe or other tool, with the chuck being mounted for powered rotation with the nut about axis 14. A tool holder 15 may carry the tapping tool 16, centered about axis 14, and be mounted for controlled movement along axis 14 toward and away from chuck 13. Driving mechanism diagrammatically represented at 17, typically computer controlled or of any other known type, may rotate chuck 13 and the nut about axis 14, and move tool holder 15 and tap 16 along axis 14 in timed relation to the rotation of the nut. The drive connections from mechanism 17 to chuck 13 and tool holder 15 are diagrammatically represented at 18 in FIG. 1.

Instead of rotating the nut and moving the tool 16 axially, these motions may of course be reversed if desired, with tool holder 15 and tap 16 being driven rotatively but not axially, and with the chuck 13 and work piece 12 being shifted axially but not driven rotatively. Also, either the tapping tool or nut may be driven both rotatively and axially, or both may have each of the two types of motion, so long as the desired relative axial and rotary movement between the tapping tool and work piece as discussed hereinafter is attained.

Tapping tool 16 may be formed as a one piece body of tool steel or other hardened material capable of cutting a thread within the interior of nut 12 without damage to the tapping tool. The tapping tool may have a shape very similar to a conventional thread cutting tap, being elongated in a left to right direction as viewed in FIG. 1, and having a mounting portion 19 adapted to be gripped and held by tool holder 15. Rightwardly of the tool holder 15 in FIG. 1, the tapping tool 16 may have the cross section illustrated in FIG. 2, typically forming four radially outwardly projecting portions 20a, 20b, 20c and 20d carrying outwardly projecting cutting teeth 21, with recesses or flutes 22 formed circularly between the portions 20a, 20b, etc. for reception of lubricant, cooling fluid and cuttings removed from the work piece. In lieu of the arrangement illustrated in FIG. 2, with the four outwardly projecting cutter carrying portions of the tap body, that body may of course have more or less than four such portions as is well known in the threading art. The cross section illustrated in FIG. 2 is uniform along the entire length of the active threading portion of the tapping tool, from its extremity 23 to the location 24 in FIG. 1. Leftwardly of that location, the body of tapping tool 16 may be externally cylindrical, square, or of any other cross sectional configuration capable of being effectively gripped and held by chuck 15. When the thread to be formed in nut body 12 is a right hand thread, portion 20a of tool 16 is the first of the four portions of the tool to engage any particular part of the nut body during a threading operation, followed by portions 20b, 20c and 20d in that order.

The thread cutting projections 21 at the top of FIGS. 1 and 2 are represented in greatly enlarged form in FIG. 3. These projections include a number of pre-forming projections 21c, 21d, 21e, 21f, 21g and 21h which partially shape the thread in the nut body, and two final shaping projections 21a and 21b at the left end of FIG. 3 which give the thread its desired ultimate increasing pitch configuration. To describe first of all the action of the final projections 21a and 21b, these two projections have the thread shaped axial cross section illustrated in FIG. 3, for forming a similarly shaped thread 25 in the interior of nut body 12, as chuck 13 and nut body 12 are rotated about axis 14, and as tool 16 is simultaneously advanced rightwardly along that axis. Thread 25 formed by projections 21a and 21b preferably has the outline configuration of a standard sixty degree thread, defined by a trailing flank surface 26, a leading flank surface 27, and an axially extending crest surface 28. In the position of FIG. 3, surfaces 26 and 27 are being cut to the illustrated shape by a cutting edge 29 at the leading side of projection 21a, and a cutting edge 30 at the trailing side of projection 21b, with these edges 29 and 30 (and the formed surfaces 26 and 27) being disposed at a sixty degree angle to one another. A third cutting edge 31 extending axially between projections 21a and 21b forms the crest surface 28 of the produced thread.

The pre-forming projections 21c through 21h of FIG. 3 are smaller than projections 21a and 21b and act to partially form the thread groove in the nut body before the final shaping process by projections 21a and 21b. In FIG. 3, six such pre-forming projections are typically illustrated, though it will be understood that more than six or less than six may be employed. The first of these projections to contact the work piece during a threading operation is the right end projection 21h, which as illustrated is relatively short radially to make an initial shallow cut in the nut body. Projection 21g has a somewhat greater radial dimension, to make a deeper cut, and the remaining projections 21f, 21e, 21d, and 21c successively deepen the inter-thread groove in the nut body before the final shaping operation by projections 21a and 21b.

The cutting projections 21a through 21h described above and shown in FIG. 3 are all formed on portion 20a of the tapping tool 16 (see FIG. 2). Each of the other three portions 20b, 20c and 20d of the tapping tool has a series of pre-forming projections corresponding to projections 21c through 21h of FIG. 3, but does not have the final shaping projections 21a and 21b. The projections 21c through 21h of the four portions 20a, 20b, etc. of the tapping tool 16 may be given their progressively increasing radial dimensions by machining these projections to have outer tapering conically curving surfaces 32 centered about axis 14. This conical truncation of the pre-forming projections may be such that the final pre-forming projection 21c of portion 20d of tool 16 (that is, the last preforming projection to engage any particular portion of the nut body before projection 21b contacts that portion of the nut) is not truncated at all and has a full radial height corresponding to that of projections 21a and 21b.

The projections 21c through 21h of portion 20b of the tapping tool are shifted slightly in a leftward direction (leftward as viewed in FIGS. 1 and 3) relative to the corresponding teeth 21c through 21h of portion 20a of the tool because of the ninety degree offset of portions 20a and 20b relative to one another about axis 14. This leftward shift causes each of the pre-forming projections 21c through 21h of portion 20b of the tapping tool to project slightly farther radially outwardly than the corresponding projection of portion 20a as a result of the conical truncation of all of the projections at 32. Similarly the cutting projections of portion 20c are shifted farther to the left in FIG. 3, and have a greater radial dimension, than the corresponding projections of portion 20b, and the projections of portion 20d are shifted leftwardly farther to the left, and extend farther out radially than the projections of portion 20c. Thus, the projections 21c through 21h of the four portions of the tapping tool all lie along an essentially helical path enabling the projections of the various portions 20c, 20b, 20c and 20d to sequentially engage and cut any particular portion of the nut body during a threading operation and thereby form an essentially helical thread groove in the nut body in a manner similar to a conventional tapping tool. The helix defined by all of these projections 21c through 21h is of uniform pitch from the right end of the tapping tool through all of these cutting edges. Also, projections 21a and 21b may be considered as lying along essentially the same uniform pitch helical path.

As an aid in understanding the preferred relationship between the configuration of cutting projections 21c through 21h of FIG. 3 and the final precise shaping teeth 21a and 21b, FIG. 3 includes reference lines 33c through 33h representing in broken lines a uniform pitch continuation of the thread pattern defined by projections 21a and 21b. For example, the lines 33c immediately to the right of projection 21b define a thread shaped profile having the same axial sectional outline configuration as projection 21a and projection 21b, and spaced from projection 21b a pitch distance p which is equal to the pitch distance p between projections 21a and 21b. Similarly, the lines or pattern 33d are spaced that same pitch distance from lines 33c, and the other reference lines 33e, 33f, 33g and 33h are all spaced apart the same uniform pitch distance.

The leading cutting edge 34 of each of the projections 21c, 21d, 21e, 21f, 21g and 21h preferably coincides with the angularly disposed line 134 defining the leading side of the corresponding broken line reference pattern 33c, 33d, 33e, 33f, 33g or 33h. The cutting edges 35 at the trailing sides of projections 21c, 21d, 21e, 21f, 21g and 21h, however, do not coincide with the angularly disposed lines 36 of the reference patterns 33c, 33d, 33e, etc., but are parallel to lines 36 and spaced rightwardly a substantial distance S relative thereto. This leaves a portion 37 of the nut body to the left of each of the cutting projections 21c through 21h, which allows for the slight increase in pitch of the thread ultimately to be formed in the nut body by the final shaping projections 21a and 21b.

To now describe a cycle of operation of the apparatus of FIGS. 1 to 7, assume that cutting tool 16 is positioned within holder 15 as shown in FIG. 1, and is initially in the position of that figure just to the left of nut body 12. The nut body may at the outset have a bore 11 of a diameter corresponding to or slightly less than that of the minor diameter cutting edges 31 of the threading tool. The nose portion 38 of the tapping tool 16 may have a slight conical taper about axis 14, and be a close fit within bore 11 to assist in centering the tapping tool within the nut body. To perform a tapping operation, the drive mechanism 17 is actuated to commence rotation of chuck 13 and nut body 12 about axis 14 at a predetermined rate, and to commence programmed axial movement of tool holder 15 and tapping tool 16 in a rightward direction in predetermined timed relation to the rotation of the nut body. During an initial portion of the threading operation, as tapping tool 16 advances rightwardly from the position of FIG. 1 just outside nut body 12 to the position of FIG. 3, the axial advancement of tapping tool 16 rightwardly relative to nut body 12 may be at a uniform rate, advancing tool 16 exactly the pitch distance p of FIG. 3 during each revolution of the nut body. As a result, the pre-forming cutting projections 21c through 21h of the four portions 20a, 20b, 20c and 20d of the tapping tool progressively form and deepen a helical thread groove of uniform pitch in the nut body. When the FIG. 3 position is reached, the portion of the nut body which is then in contact with projection 21c of portion 20a of the tool is being cut by that projection to a cross section corresponding to that of the illustrated projection 21c. The corresponding projections 21c of the other three portions 20b, 20c and 20d of the tool are at the same time cutting the nut body to a slightly greater radial depth, giving the groove an ultimate major diameter the same as the major diameter of an outer cutting edge 230 of projection 21b.

When the tool reaches a point at which the final shaping teeth 21a and 21b are commencing their cutting operation in the work piece, such as the position illustrated in FIG. 3 or a slightly earlier position, the computer controlled mechanism 17 automatically converts to a changed condition in which, instead of advancing the threading tool rightwardly at a uniform rate per revolution, the tool is advanced rightwardly at a progressively increasing rate per revolution. In a nut of the type disclosed in Pat. No. 3,842,464, that increase in the rate of advancement, and the resultant increase in pitch in the thread formed in the nut body, are relatively slight, typically being on the order of one tenth of one thousandth of an inch per revolution for certain thread sizes such as ⅝×16. In order to make this advancement visible in the drawings, the advancement has been exaggerated.

FIG. 5 represents the positions of the final cutting projections 21a and 21b after they have advanced through one complete revolution of the nut body from the position of FIG. 3. FIG. 4 shows the completed thread in the nut body after all of the cutting projections 21a through 21h of tool 16 have advanced entirely through the nut. Reference lines 33c, 33d, etc. and the FIG. 3 positions of the cutters have been included in FIG. 4 to assist in understanding the thread cutting action.

When the nut body and tool 16 are in their FIG. 3 positions (or a slightly earlier position if preferred) the rate of relative axial advancement of the threading tool and nut, and the resultant lead angle of the portion 71 of the thread then being formed, correspond to the pitch distance p between projections 21a and 21b. That is, in the FIG. 3 position the tool 16 and nut body are advancing axially relative to one another at an instantaneous rate and lead angle and effective pitch which would advance these parts axially through the distance p in one revolution if the rate of advancement did not increase. In this connection, the "effective pitch" of the relative motion and formed thread at any particular point is defined as the distance which the thread would advance axially from that point during a single revolution if the rate of advancement did not change. The "effective pitch" in the FIG. 3 position is therefore the distance p.

During one revolution of the nut body from the FIG. 3 position, the rate of relative axial advancement of the tool and nut body progressively increases slightly, so that, by the time projection 21b reaches its FIG. 5 position, it does not coincide with the previously mentioned reference lines 33c, but is shifted slightly to the right relative thereto. Similarly, the projection 21a does not, at the end of the first revolution, coincide in position with the FIG. 3 position of projection 21b at the commencement of that revolution, but is shifted rightwardly relative thereto (shift exaggerated in FIG. 5). As a result, the trailing cutting edge 30 of projection 21b and the leading cutting edge 29 of projection 21a, and the axially extending edge 31 therebetween, form a second turn 72 of the thread in the nut which is shifted slightly in a rightward direction relative to the uniform pitch reference lines 33c and thus has an increased lead angle and effective pitch greater than the starting pitch p. In FIG. 5, the FIG. 3 position of the leading edge 29 of projection 21b is represented at 129. The trailing edge 40 of projection 21a is in FIG. 5 spaced slightly from the surface 27 previously formed by edge 30 of the projection 21b.

During the next revolution of the nut body and tapping tool relative to one another, the rate of axial advance of the tapping tool continues to increase at the same uniform rate, so that the third turn 73 of the thread is shifted farther to the right relative to reference patterns 33c and 33d, as represented by the spacing at 78 in FIG. 4. Similarly, the fourth turn 74 is shifted still farther, as represented at 79, and each of the other turns 75, 76, 77 and 78 is shifted farther than the preceding turn (see spacing at 80, 81, 82 and 83). The shift is never great enough, however, to permit the cuts previously made by pre-forming projections 21c through 21h to interfere with the shape of the ultimate increasing pitch groove formed by projections 21a and 21b. This is true because of the reduced width of each projection 21c through 21h as represented at 37 in FIG. 3. The right flank surfaces 183 of the thread turns do not reach the lines 84 of FIG. 4 which define the cuts made in FIG. 3 by the left cutting edges 35 of pre-forming cutters 21c, 21d, etc. The axial dimension of the inter-thread groove in FIG. 4 gradually increases at each turn (in a rightward direction), while the axial cross section and axial thickness of the formed thread itself remain uniform. In this way, the desired thread of progressively increasing pitch is formed in the nut. The thread cutting operation performed by projections 21a and 21b is similar to that performed by the two projections or teeth of the threading tool 54 shown in FIGS. 10 and 11 of U.S. Pat. No. 4,842,464.

All of the various cutting projections 21a, 21b, 21c, etc. of the threading tool 16 are relieved circularly behind their cutting edges in a manner permitting those edges to properly engage and cut the material of the nut body at the different lead angles and effective pitches at which the cutting projections move relative to the nut body during formation of the thread of increasing pitch. This feature is illustrated in FIG. 7, which shows a portion of the cutting projection 21b of FIG. 3 in cross section. The cutting edges of that projection 21b are at the lower end of the projection as viewed in FIG. 7, and include the previously mentioned cutting edge 30 at the left side of projection 21b, a cutting edge 130 at the right side of the projection, and an axially extending cutting edge 230 (visible in FIG. 3 but not in FIG. 7) for forming the root portion of the thread groove in the nut body. These three cutting edges define the thread profile illustrated in FIG. 3, corresponding to that of a standard sixty degree thread. The opposite side surfaces 48 and 49 of cutting projection 21b circularly behind cutting edges 30, 130 and 230 have a similar sixty degree profile approximately the same as the cutting edges, but with the axial thickness of that profile gradually reducing toward the trailing end 50 of the cutting projection, as represented by the fact that the surfaces 48 and 49 gradually converge in FIG. 7 from their leading ends to their trailing ends. This tapering of the cutting projection is such that surface 49 at the right side of the projection is disposed at a lead angle at least as great as, and preferably slightly greater than, the maximum lead angle at which projection 21b and the nut body move relative to one another during a threading operation, that is, the maximum lead angle of the thread formed in the nut body. The maximum lead angle of the thread of course occurs at the right end of the nut in FIG. 3. The opposite side surface 48 of projection 21b is disposed at a lead angle at least as small as, and preferably slightly smaller than, the minimum lead angle at which projection 21b moves relative to the nut body, and the resultant minimum lead angle of the formed groove in the nut body, at the left end of that body. This relationship permits the cutting edges to properly engage and cut the material of the nut body at all times during the thread cutting operation, without interferance by surfaces 48 and 49, and in spite of the fact that the rates of axial advancement of the cutting tool and the formed thread per revolution vary during that operation. While FIG. 7 illustrates the tapered shape of only the single cutting projection 21b, it will be understood that all of the other cutting projections are similarly tapered, with the same relationship between the lead angles of their opposite side surfaces and the maximum and minimum lead angles of the tool and nut relative motion and resulting thread.

Figure 6:
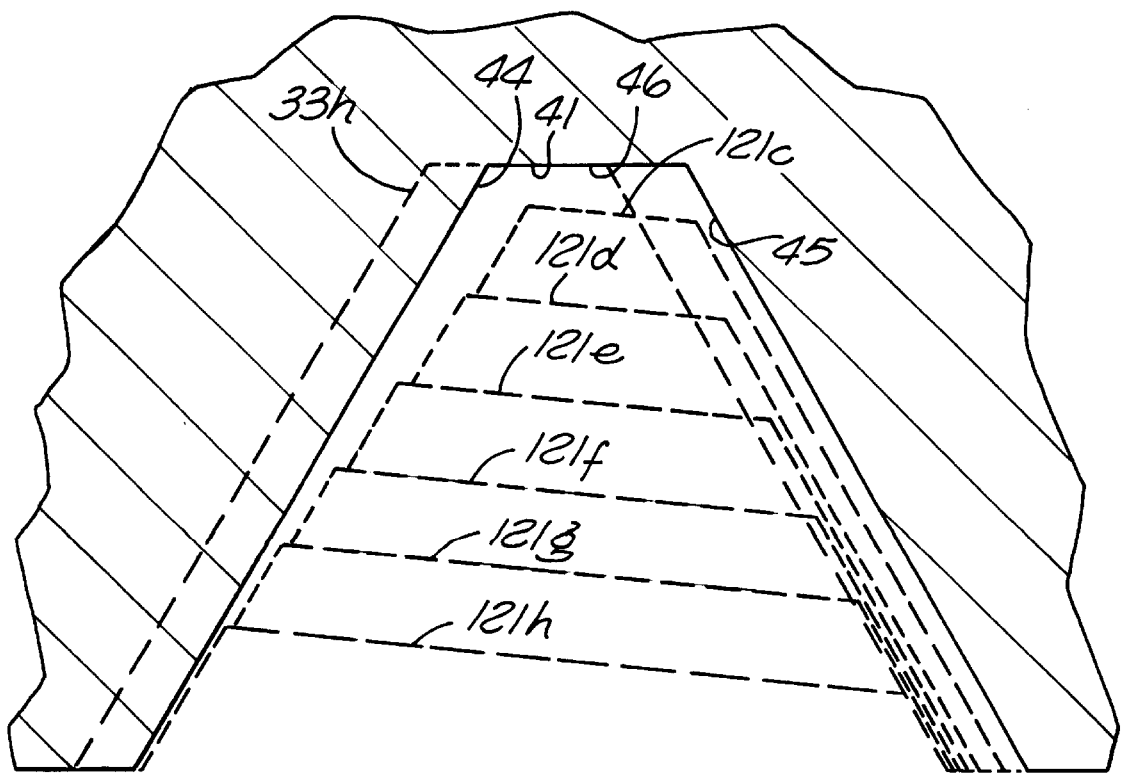
FIG. 6 is an enlarged fragmentary view showing the right end turn of the completely formed thread of FIG. 4, with illustration on the figure of the cuts of the various pre-forming projections of the tapping tool.

FIG. 6 illustrates in enlarged form the final configuration of the right hand end portion of the thread groove 41 in the nut body as viewed in FIG. 4. In FIG. 6, the cut made by projection 21h is represented in broken lines at 121h, and the cuts made by projections 21g, 21f, 21e, 21d and 21c are represented in broken lines at 121g, 121f, 121e, 121d and 121c, respectively. Each of these cuts is shifted slightly to the right relative to the preceding cut, by reason of the fact that there is an increase in the rate of axial advancement of the threading tool beyond the FIG. 3 position of that tool. The final cut made by edge 29 of projection 21a, to form the right wall 45 of the thread groove, eliminates the irregularity formed in that wall of the groove resulting from the rightward shift of the cuts made by projections 21c, 21d, etc.

It is particularly noted in FIG. 6, as previously pointed out with respect to FIG. 4, that the reduced axial thicknesses of cutting projections 22c through 22h, and the cuts 121c through 121h made thereby, resulting from the discussed spaced relationship at 37 in FIG. 3, allow those projections and their cuts to at all points along their path of movement relative to the nut body fall within the axial sectional profile of the inter-thread groove 41 of varying pitch ultimately formed in the work piece. None of the cuts 121c through 121h of FIG. 6 is wide enough to interfere with wall 44 or 45 or high enough to interfere with upper surface 46 of the groove, thus permitting the final projections 21a and 21b to give the thread its ultimate shape. This is true at all points along the entire generally helical extent of the formed thread. A drawing along the lines of FIG. 6 could be produced for any desired point along the length of the thread.

In the threading process as thus far described, it is assumed that the threading tool 16 is advancing axially relative to nut body 12 at a uniform rate per revolution until it reaches the position illustrated in FIG. 3, and is then advanced at a progressively and uniformly increasing rate per revolution until all of the cutting projections have moved entirely through the nut body and completed their threading operation. As a variation of the invention, the threading tool may be advanced at an increasing rate through the entire threading process, that is, from a point prior to initial engagement of the cutting tool with the left end of the nut body to the point at which all of the cutting projections of the tool have moved through the nut body and out of contact with it at its right side. FIG. 8 illustrates a tool 51 which may be utilized in this manner. The threading tool 51 may be identical with tapping tool 16 as illustrated in FIG. 3 except that the six pre-forming projections 52c, 52d, 52e, 52f, 52g and 52h of FIG. 8 (corresponding to projections 21c, 21d, 21e, 21f, 21g and 21h of FIG. 3) are cut away slightly at their leading sides (right sides in FIG. 8) as well as their trailing sides. To assist in understanding this feature, FIG. 8 includes the same uniform pitch thread shaped reference lines or patterns 33c, 33d, 33e, 33f, 33g and 33h as in FIG. 3. In FIG. 3, the leading cutting edge 34 of each of the pre-forming projections 21c, 21d, etc. coincides with the angularly disposed line 134 defining the leading side of the corresponding reference pattern 33c, 33d, etc. In FIG. 8, the leading cutting edges 53 (corresponding to edges 34 of FIG. 3) do not coincide with the inclined lines 134, but instead are parallel to those lines and spaced leftwardly therefrom, in a manner similar to the previously described spaced relationship at the left sides of the cutting projections, as discussed in connection with FIG. 3. This relief of the cutting projections at their right sides in FIG. 8 enables those projections, during axial advancement of the tool before reaching the FIG. 3 position, to at all times remain entirely within the axial sectional profile of the increasing pitch thread ultimately formed in the nut body, and thus prevent the cutting projections 52c, 52d, etc. from interfering with proper formation of the opposite side walls of the thread groove. It will of course be understood that the left end of the threading tool 51 of FIG. 8 includes two thread cutting projections identical with the projections 21a and 21b of FIG. 3 and having the same relationship to reference patterns 33c, 33d, etc. as in FIG. 3. The projections 21a and 21b have been omitted in FIG. 8 to simplify the drawing.

FIG. 9 illustrates diagrammatically the manner in which the axial advancement of threading tool 51 of FIG. 8 is controlled to maintain the various pre-forming cutting projections 52c, 52d, etc. within the profile of the ultimate thread groove formed in the nut body during the initial advancement of the tool up to a position corresponding to that of FIG. 3. When the tool of FIGS. 8 and 9 is in a position corresponding to or slightly to the left of that shown in FIG. 3, in which position the final thread shaping projections 21a and 21b are commencing their threading operation to produce the ultimate thread of increasing pitch, the tool 51 is at that position being advanced axially relative to the nut at a lead angle and effective pitch corresponding to pitch p. Consequently, the portion of the thread then being formed in the nut has that lead angle and effective pitch. When tool 51 is in a position leftwardly of the FIG. 3 position, such as the position of FIG. 1 just prior to engagement of the threading tool with the nut body, the tool is being advanced axially in a rightward direction at a rate and lead angle and effective pitch less than the rate and lead angle and effective pitch in the FIG. 3 position. From the position of FIG. 1 to a position corresponding to that of FIG. 3, the rate of axial advancement of the tool 51 per revolution gradually increases, preferably at a uniform rate. Beyond the position corresponding to FIG. 3, the rate of advancement continues to increase, preferably at that same uniform rate per revolution, until all of the cutting edges have moved rightwardly beyond the right end of the nut body. During the portion of this advancement up to the point at which the tool reaches the FIG. 3 position, the various cutting edges 52c, 52d, etc. make cuts in the nut body which are slightly shifted relative to one another, as represented in FIG. 9. The thread groove 54 illustrated in that Figure may be considered as corresponding to the groove 154 which is nearest the left end of the nut body in FIG. 4.

When the smallest cutting projection 52b of FIG. 8 is in contact with the nut body 12, at the location illustrated in FIG. 9, projection 52h makes the cut identified by that number in FIG. 9. Because of the slow rate of advancement of the threading tool at that point, the cut 52h is shifted rightwardly, with the result that its right edge 55 is near but does not reach the plane in which the right hand wall 56 of the ultimate increasing pitch thread groove 54 is to be formed by the final two thread shaping projections 21a and 21b. If projection 51h were not cut away at its right side as illustrated in FIG. 8, the right portion of that projection would extend rightwardly beyond the planar surface 56 and prevent final formation of that surface at a proper location. In similar manner, the projections 52g, 52f, 52e, 52d and 52c make sequential cuts at the locations represented in FIG. 9. Because of the slow though progressively increasing rate of advancement of the tool, each of these successive cuts is shifted slightly to the left of the preceding one as illustrated in FIG. 9. However, all of these cuts in their entirety always remain within the profile of the groove 54 ultimately to be formed by the final shaping projections 21a and 21b. The same is true at all points rightwardly beyond the location represented in FIG. 9, with the cuts made by the different cutting projections remaining within the profile of the final groove to be formed at all locations. After the tool reaches a position corresponding to that of FIG. 3, the cutting action of the tool 51 of FIG. 8 is essentially the same as has been described in connection with FIG. 3. It will of course be understood that the tool of FIG. 8 may if preferred be operated in accordance with the timing cycle described in connection with the arrangement shown in FIG. 3, with the tool 51 being advanced axially at a uniform rate per cycle until a position corresponding to FIG. 3 is reached, and then being advanced at a uniformly increasing rate while the final shaping projections 21a and 21b are acting on the nut body.

Figure 10:
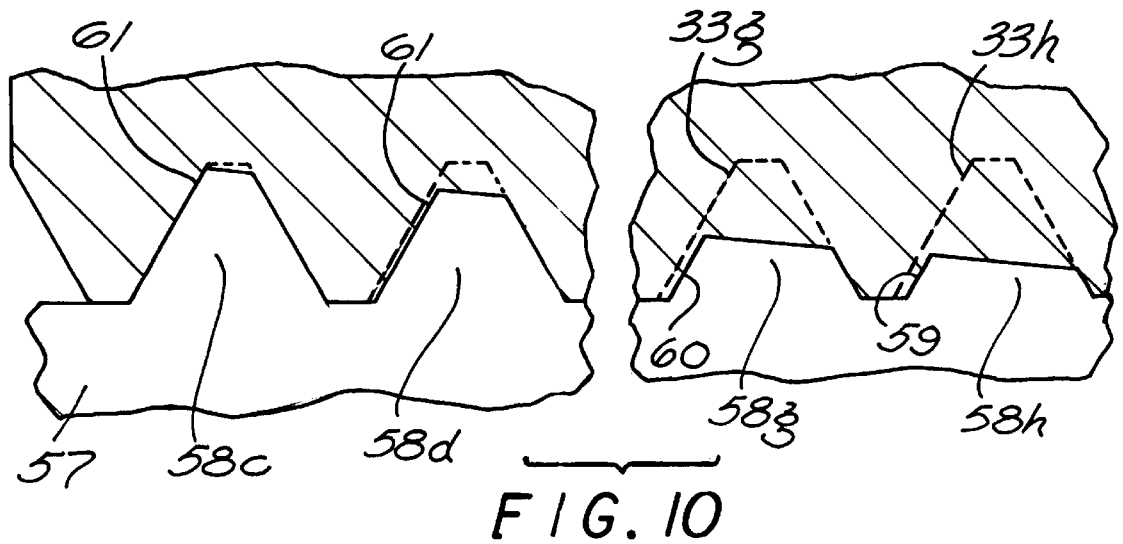
FIG. 10 is a fragmentary view similar to FIGS. 3 and 8 of another variational type of threading tool.

FIG. 10 illustrates fragmentarily another variational arrangement, in which the threading tool 57 may be identical with that shown in FIG. 3 except that the various pre-forming projections represented at 21c, 21d, 21e, 21f, 21g and 21h in FIG. 3 are shaped slightly differently at their trailing sides. FIG. 10 shows only four of these projections, identified by the numbers 58c, 58d, 58g and 58h, with the intermediate projections (corresponding to 21e and 21f of FIG. 3) being omitted to simplify the drawing. The left edge 59 of the smallest of these projections 58h may be substantially the same as the left edge of projection 21h in FIG. 3, being parallel to and spaced a substantial distance rightwardly of the adjacent portion of reference line 33h. The next larger projection 58g has its left hand cutting edge 60 slightly closer to its adjacent reference line 33g, but still parallel thereto. The cutting projections leftwardly of projection 58g similarly have edges 61 which are parallel to but move progressively closer to the corresponding reference lines. This change may be a gradual and progressive change, with the spacing ultimately disappearing and the cutting edge almost coinciding with the reference line at the left side of cutter 58c, the last pre-forming cutter which engages the nut body just prior to its contact with the first of the final shaping projections 21b.

In utilizing the tool of FIG. 10, the timing procedure described in connection with FIGS. 3 and 4 may be utilized, to advance the tool 57 axially at a uniform rate per revolution up to the position illustrated in FIG. 3 with a progressive and uniform increase in the rate of axial advancement per revolution beyond that FIG. 3 position. The progressive increase in width of the cutaway regions at the left sides of cutters 53c through 58h is permissible because the final shaping projections 21a and 21b are shifted only slightly relative to reference lines 33c, etc. near the left end of the nut body and are shifted much farther relative to the reference lines as the cutters advance toward the right end of the nut.

Figure 11:
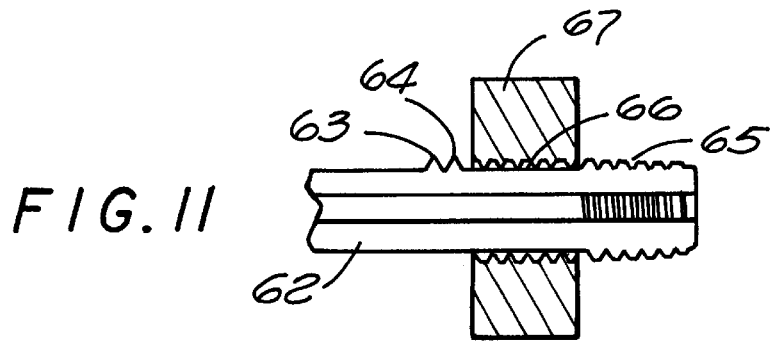
FIG. 11 is a fragmentary view corresponding to a portion of FIG. 1 and showing another form of threading tool.

FIG. 11 shows another form of threading tool 62 which may be identical with the tool 16 of FIGS. 1 to 7 except that the final thread shaping projections 63 and 64, corresponding to projections 21a and 21b of FIG. 3, are spaced axially from all of the other projections 65, corresponding to projections 21c, 21d, 21e, 21f, 21g and 21h of FIG. 3, with cylindrically curved external surfaces 66 formed on the tool axially between the spaced projections and at a diameter not greater than the minor diameter of the cutting projections and the thread formed thereby. The space between projections 64 and 65 is long enough to permit the pre-forming projections 65 to all advance entirely through the nut body 67 and complete formation of their uniform pitch thread therein before projections 63 and 64 first contact the nut. The tool 62 is advanced axially at a uniform rate per revolution while projections 65 perform their pre-forming operation, and is advanced at a progressively and uniformly increasing rate per revolution while projections 63 and 64 perform their final shaping operation, as in FIG. 3.

Figure 12:
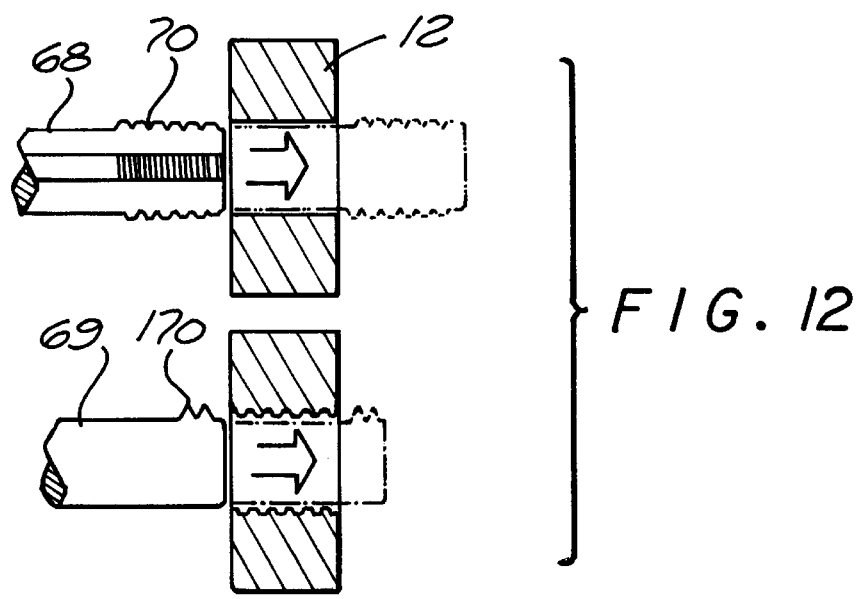
FIG. 12 represents diagrammatically a process embodying certain features of the invention and utilizing two separate threading tools.

Some but not all of the advantages of the invention can be attained utilizing two separate threading tools 68 and 69 as shown in FIG. 12. The first of these tools has several circularly spaced series of thread cutting pre-forming projections 70 which may be the same as projections 21c, 21d, 21e, 21f, 21g and 21h of FIG. 3. Tool 68 is advanced both rotatively and axially at a preferably uniform rate per revolution, relative to the nut body 12, from the full line position to the broken line position of FIG. 12, so that projections 70 form a partial thread of uniform pitch in essentially the same manner as in FIG. 3. The nut is then moved to a position opposite tool 60, which has two projections 170 corresponding to projections 21a and 21b of FIG. 3, and which is advanced rotatively and axially relative to and through the nut body at a progressively and uniformly increasing pitch, in correspondence with the movement of projections 21a and 21b in FIG. 3 relative to the nut, to give the thread its final increasing pitch configuration.

The projections 70 of threading tool 68, instead of being shaped in correspondence with projections 21c, 21d, etc. of FIG. 3, may have any other shape capable of forming a partial thread groove which will be contained entirely within the space defined by the inter-thread groove of increasing pitch ultimately formed by projections 170 of tool 69. For example, projections 70 may correspond to projections 52c through 52h of FIG. 8, or projections 58c through 58h of FIG. 10. In this connection, it is noted that projections 52c through 52h of FIG. 8 have an axial sectional cutting profile which is essentially the same as an undersize conventional tap for a standard 60 degree thread. Consequently, in the process of FIG. 12, the pre-forming tool 68 may be such a standard tapping tool, of a size designed for tapping of a thread of a pitch diameter slightly smaller than that of the increasing pitch thread ultimately to be formed in the nut body. This tool will then form a thread groove in the nut body having a uniform pitch and of reduced axial width because of the reduced pitch diameter of the tool to lie entirely within the profile of the final increasing pitch inter-thread groove.

All of the forms of the invention thus far described produce a thread whose axial thickness and axial cross section remain uniform along the entire length of the thread, with the groove between successive turns of the thread progressively increasing in axial width in correspondence with the increase in pitch of the thread. The uniform cross section of the thread results because in each instance two thread cutting projections, such as projections 21a and 21b of FIG. 3, simultaneously form opposite side surfaces of the thread, such as surfaces 26 and 27 in FIG. 3. It is contemplated, however, that any of the forms of the invention may be adapted to produce a thread whose axial thickness increases progressively while the groove between turns of the thread is of uniform axial width. This may be accomplished with the FIG. 3 tool, for example, by omitting its projection 21a, and otherwise constructing and operating the tool as previously described. Projection 21b then acts by itself as a single point threading tool to define the unchanging shape of the groove and cause the increase in thickness of the thread in correspondence with the increase in the rate of advancement of the tool. The same result can be attained by omitting the projection corresponding to projection 21a in any of the other forms of the invention. In each instance, as in the other procedures previously described, the cuts made by pre-forming projections 21c through 21h always remain within the axial profile of the thread groove of increasing pitch ultimately formed by projection 21b, and thus do not interfere with the proper configuration of that groove.

Figure 13:
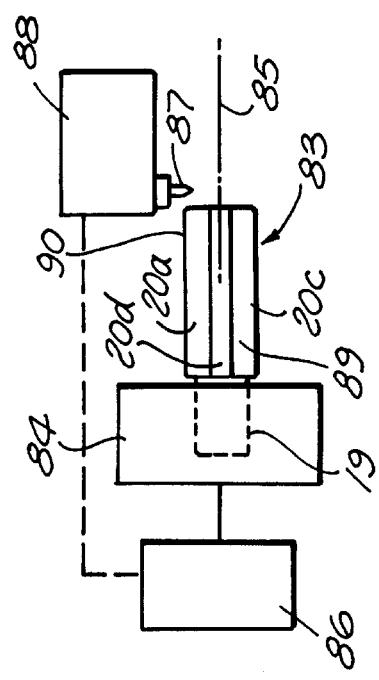
FIG. 13 illustrates diagrammatically a process for manufacturing the threading tool of FIGS. 1 to 7.
Figure 14:
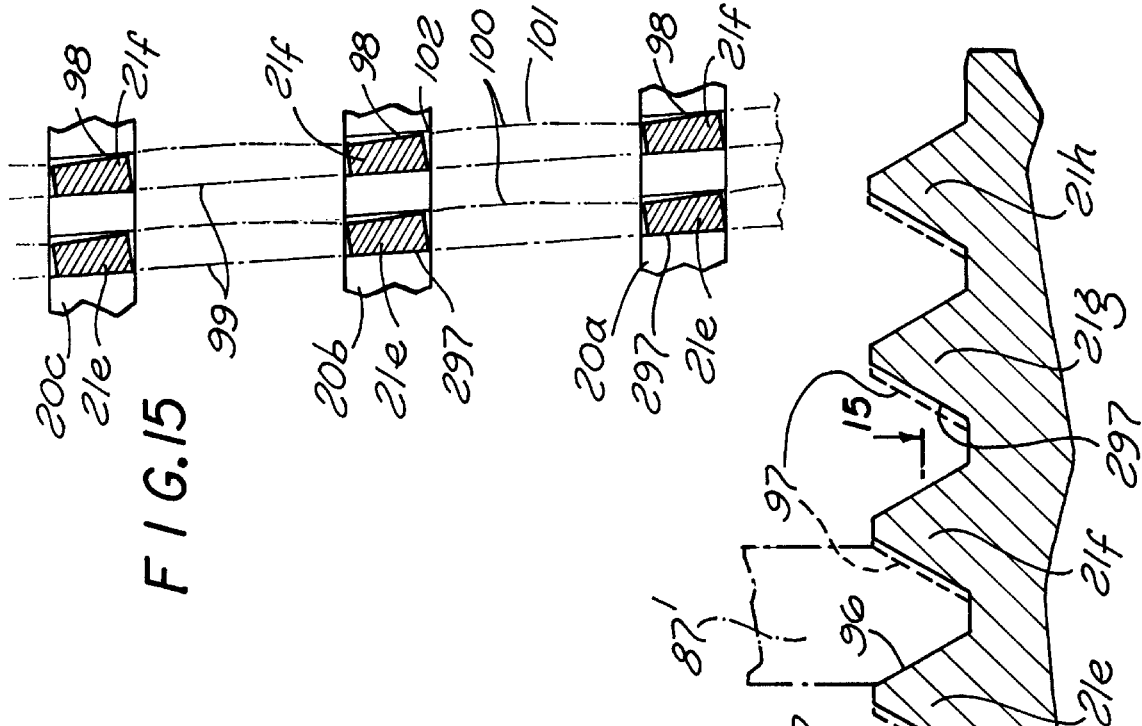
FIG. 14 is an enlarged axial section through a portion of the apparatus of FIG. 13 and illustrating three steps in the preferred process of forming the threading tool.
Figure 15:
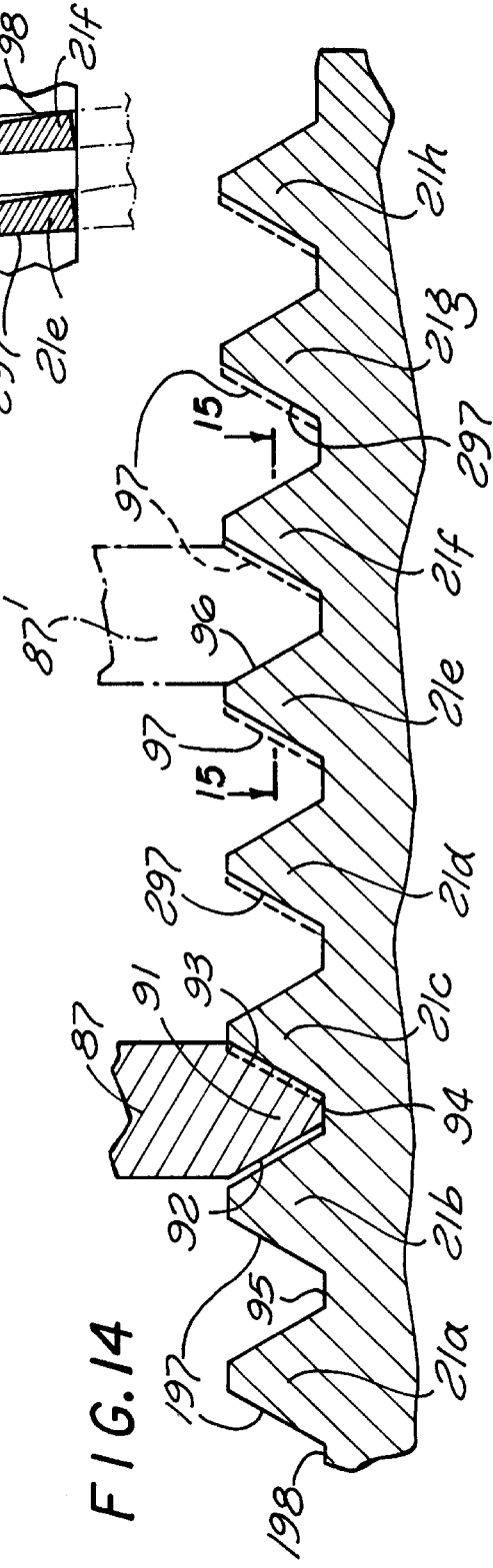
FIG. 15 is a fragmentary view taken partially on line 15—15 of FIG. 14 and developed circularly about the axis of the tool being formed.

FIGS. 13 through 15 illustrate diagrammatically a process and apparatus for manufacturing the thread tapping tool 16 of FIGS. 1 to 7. It will be apparent that similar processes may be employed for producing the other forms of tapping tools embodying the invention. With reference first to FIG. 13, there is illustrated at 83 in that Figure a metal body from which the tapping tool 16 of FIGS. 1 to 7 is to be formed. It is assumed in FIG. 13 that body 83 has already been machined or otherwise formed to the condition shown in FIG. 1 except for formation of the thread forming projections 21a through 21h on the body. Mounting portion 19 at the left end of body 83 is held by a chuck 84 which may rotate tool body 83 about an axis 85 under the control of a computer actuated drive mechanism 86. A thread forming tool 87 may be carried by a tool holder 88 which is power driven axially, that is, parallel to axis 85, under the control of computer actuated drive mechanism 86, and in timed relation to the rotation of chuck 84 and tool body 83. Alternatively, any other type of drive arrangement may be utilized which is capable of producing timed relative rotary and axial movement between body 83 and cutter 87.

The portion 89 of body 83 which protrudes from chuck 84 may have a cross section corresponding essentially to that illustrated in FIG. 2 except that the outer extremities of the four radially outwardly projecting portions 20a through 20d are unthreaded and have outer cylindrically curved surfaces 90 centered about axis 85 and of a diameter equal to the major diameter of the projections 21a, 21b, etc. through 21h ultimately to be provided on portions 20a, etc. of body 83.

Element 87 may be a conventional thread cutting tool, mounted in holder 88 to project radially inwardly toward axis 85, and having an inner tip portion 91 (FIG. 14) shaped to have an axial sectional profile corresponding to that of a standard sixty degree thread, and defined by cutting edges 92 and 93 at opposite sides of the cutter disposed at a sixty degree angle with respect to one another. A third cutting edge 94 extending axially between the extremities of edges 92 and 93 forms axially extending root surfaces 95 in body 83. In lieu of the cutter illustrated in FIG. 14, element 87 may in certain instances be another type of thread forming device, such as a thread grinding wheel, thread roller, or the like.

FIGS. 14 and 15 illustrate diagrammatically three successive steps which may be performed by thread cutting tool 87 in the outer surfaces of portions 20a, 20b, etc. of body 83. After completion of these three steps, a fourth step may be performed by cutter 87 or another cutter to truncate the pre-forming projections 21c through 21h as represented at 32 in FIG. 3, or if desired that truncating step may be performed before the three steps illustrated in FIGS. 14 and 15, or between any two of those steps.

The first of the three steps is to form a uniform pitch sixty degree thread in the outer surfaces of body 83 by rotating that body and simultaneously advancing tool holder 83 and thread cutting tool 87 axially (preferably leftwardly in FIG. 14) relative to body 83 at a uniform rate of advancement per revolution corresponding to pitch p of FIG. 3. This step is illustrated by the broken line representation of cutter 87 at 87' in FIG. 14. During such formation of the thread shaped projections on the outer surfaces of the body 83, the previously mentioned cutting edge 92 of cutter 87 forms inclined flank surfaces 96 at the right sides of those projections, while the opposite cutting edge 93 of cutter 87 forms surfaces 97 at the trailing sides of pre-forming projections 21c, 21d, 21e, 21f, 21g and 21h, and surfaces 197 at the left sides of the two final shaping projections 21a and 21b in the left portion of FIG. 14. This cutting action thus initially forms all of the projections 21a through 21h to be of the same axial sectional profile and at uniform spacing as in a standard thread of pitch p. That configuration may of course be produced by a series of successive cuts in body 83, with element 87 being shifted slightly radially inwardly between the different cuts to progressively deepen the thread groove formed in body 83. Leftwardly beyond projection 21a at the left end of FIG. 14, cutter 87 may be controlled to form a cylindrical surface 198 of a diameter corresponding to minor diameter surfaces 95 at the roots of projections 21a, 21b, etc. The second step of the process is to advance cutter 87 and tool body 83 through another cycle of relative rotary and axial movement, preferably moving leftwardly from the right end of element 83, in a relation removing material from the left side flank surfaces of pre-forming projections 21c through 21h, but not the final shaping projections 21a and 21b. The position of the threading tool 87 relative to the thread groove during this step is illustrated by the full line representation of cutter 87 in FIG. 14. In that position, the cutting edge 93 at the right side of element 87, which in the previous step had formed flank surfaces at the locations 97 in FIG. 14, acts to form surfaces 297 at the left sides of the projections. These surfaces 297 will ultimately serve as the inclined left edges 35 of the pre-forming cutters in FIG. 3. The rate of axial advancement of element 87 per revolution of body 83 is the same during this second step of the process as during the first step, but with the axial advancement slightly delayed or offset to the right with respect to the cycle followed in the first step, so that surfaces 297 are spaced rightwardly of the initially formed surfaces 97 the same distance for each of the pre-forming projections 21c through 21h. This second step is halted before element 87 reaches the two final shaping projections 21a and 21b on portion 20a of body 83, so that these projections 21a and 21b are left with a full thread profile as in FIG. 3.

The third step in the process of FIGS. 13 to 15 is performed with cutter 87 again in a position such as that represented in broken lines at 87', to further shape the right hand flank surfaces 96 of all of the projections 21a through 21h, but with the rate of axial advancement of tool 87 per revolution of body 83 being alternately increased slightly and decreased slightly through the entire machining operation to produce surfaces 98 (FIG. 15) of increased lead angle on the various projections corresponding to the surfaces 49 of FIG. 7.

FIG. 15 is a developed view representing diagrammatically the cuts which are made on pre-forming projections 21c through 21h of the various portions 20a, 20b, 20c and 20d of body 83. The lower portion of FIG. 15 shows two of the tapping projections 21e and 21f on portion 20a of body 83, as viewed in line 15—15 of FIG. 14. Above these projections in FIG. 15, the two corresponding projections 21e and 21f of portion 20b of the tapping tool are illustrated, and still higher the two projections 21e and 21f of portion 20c are shown. The view is thus developed circularly about the axis 85 of body 83 and about the corresponding axis 14 of the finished tool illustrated in FIG. 1. The fourth portion 20d of the tapping tool body has a similar pair of projections 21e and 21f, which have been omitted from FIG. 15 to simplify the drawing.

The broken lines 99 of FIG. 15 represent the cuts made by tool 87 in the second step of the above discussed process, in which the cutter is positioned as shown in full lines at 87 in FIG. 14, that is, while the right hand cutting edges 93 of element 87 are forming surfaces 297 at the left sides of projections 21c through 21h of the four portions 20a, 20b, 20c and 20d of the tapping tool. Since the rate of axial advancement of tool 87 per revolution of body 83 is uniform during formation of the surfaces 297, the lines 99 appear as straight lines in the developed view FIG. 15. The broken lines 100 in FIG. 15 represent the final cuts made on surfaces 96 at the right sides of projections 21a through 21h in the third step of the process. Because the rate of axial advancement of element 87 per revolution of body 83 alternately increases and decreases during this step of the process, the lines 100 appear as axially oscillating or waving lines in FIG. 15. While cutter 87 is in engagement with the right side of each of the projections 21a through 21h of the four portions of the tool body 83, the rate of axial advancement of tool 87 per revolution of body 83 is slightly greater than the rate utilized during the first step of the process in forming the uniform pitch projections at pitch p, so that surfaces 98 at the right sides of the projections are given a greater axial lead than surfaces 297 at the left sides of those projections. The axial lead of surfaces 98 is as previously discussed at least as great as and preferably slightly greater than the maximum lead angle of the varying pitch thread to be formed by tapping tool 16 in nut 12 of FIG. 1. After tool 87 has cut this increased lead angle surface 98 on one of the projections, say for example projection 21f of portion 21a in the lower portion of FIG. 15, the computer controlled drive mechanism 86 acts to automatically slightly reduce the rate of axial advancement of tool 87 per revolution of body 83, to a rate slightly less than that associated with pitch p, as represented by a slight curving of the broken line 100 at 101 in FIG. 15. That reduction in the rate of advancement is enough to properly position cutter 87 for engagement at 102 with the next successive projection to be shaped (projection 21f of portion 20b of the tapping tool), with the rate of advancement then increasing again to form the increased lead surface 98 at the right side of this second projection. The rate of axial advancement is alternately increased and decreased in this same way as cutter 87 successively engages and forms increased lead surfaces 98 at the right sides of all of the projections 21a through 21h of portion 20a of the tool, and all of the projections 21c through 21h of portions 20b, 20c and 20d of the tapping tool. Portions 21b, 21c and 21d of course do not have the final shaping projections 21a and 21b. The outer surfaces of these three portions of the tool may be ground away or otherwise machined or formed to have continuations of the cylindrical surface 98 at the locations at which projections 21a and 21b of these three portions of the tool would otherwise be formed.

It is contemplated that the three steps discussed above may be performed in a different order than has been described, or some of those steps may be combined into a single step or omitted. For example, the first two steps may be combined, with the tool 87 acting during a continuous cycle of axial advancement from right to left in FIG. 14 to first form surfaces 297 on pre-forming projections 21c through 21h, and then form surfaces 197 on projections 21a and 21b. During the first portion of this cycle of advancement, cutter 87 is in a position relative to the groove corresponding to the full line position of element 87 in FIG. 14, to form surfaces 297 on projections 21c through 21h. After cutter 87 moves out of engagement with the last of the pre-forming projections, the rate of axial advancement is increased long enough to shift the cutter leftwardly for proper formation of surfaces 197 on projections 21a and 21b. During actual formation of those surfaces 197, the rate of axial advancement per revolution is returned to the same rate as during formation of surfaces 297. It will of course be understood that several passes of the tool may be made to progressively deepen a series of such continuous cuts made in the tapping tool, with the cutter 87 being advanced leftwardly at an increased rate during each of these passes after leaving the last of the pre-forming projections 21c through 21h, to shift the cutter as discussed.

After the above discussed combined process of producing all of the left side flank surfaces 297 and 197 in a single procedure, the surfaces 98 of increased lead at the opposite sides of all of the projections may then be formed by a final cutting operation in which the rate of axial advancement of element 87 per revolution is alternately increased and decreased as represented by broken lines 100 of FIG. 15. As a further possible variation, this process in which surfaces 98 are formed, by an oscillating or waving motion, may itself be the first step of the procedure, with the opposite flank surfaces 297 and 197 at the trailing sides of the projections being formed subsequently either in one or two steps as desired.

The outer conically tapered surfaces 32 (FIG. 3) of pre-forming projections 21c through 21h may be formed on those projections by machining body 83 conically either before or after the various cutting projections have been formed, or at any intermediate point in the process. Also, the axial recesses 22 in the tool (see FIG. 2) may be formed in body 83 before the projections are formed, after they have been formed, or at any other point.

While certain specific embodiments of the present invention have been disclosed as typical, the invention is not limited to these particular forms, but rather is applicable broadly to all such variations as fall within the scope of the appended claims. For example, the teachings of the invention may be applied to formation of a thread which varies in pitch in accordance with any desired pattern of change, not necessarily the described simple uniform increase in pitch. The invention may also produce an external rather than internal thread of increasing or otherwise varying pitch, by a die having cutting edges similar to those illustrated in FIG. 3 or others of the figures but projecting radially inwardly to form the external thread. It is also contemplated that the thread forming projections or portions of the tools embodying the invention may in some instances be designed to forceably deform or reshape the material of the work piece to the desired configuration of a thread and groove of varying pitch without actually cutting the material and in a manner similar to a thread rolling operation.

In the FIG. 3 form of the invention, it is currently felt desirable that the axial dimension S, that is, the axial spacing between the relieved or cutaway flank surfaces 35 of the pre-forming projections 21c to 21h and the corresponding reference lines 36, be at least as great as or approximately equal to, and for best results slightly greater than, a dimension which may be referred to as the "total axial advance" or "total axial shift" of thread 11 in nut body 12 resulting from the non-uniform rate of relative axial movement of the tapping tool and nut body. To define those terms more specifically, consider the position of tapping tool 16 after it has advanced rightwardly through the nut from the position of FIG. 3 to a position in which projections 21a and 21b are completing formation of the final portion of the nut thread and are moving rightwardly out of contact with the nut body. As discussed previously, the final portion of the variable pitch thread formed at that point is shifted slightly to the right of the position it would assume if the tool had moved at a uniform rate of advancement through the nut corresponding to the pattern defined by the reference lines 33c, 33d, etc. The axial distance between these two positions (the position produced by the variable rate of advancement and the position which would result from a uniform rate of advancement along reference lines 33c, etc.) is the dimension referred to as the total axial advance or total axial shift produced in the nut thread by the variation in the rate of relative axial advancement of the tool body and work piece. The axial relief dimension S of FIG. 3 is desirably slightly greater than the discussed total axial advance or total axial shift so that pre-forming projections 21c, 21d, etc. leave some material from which projections 21a and 21b may make a final precise cut.

In the FIG. 10 arrangement, the axial relief dimension corresponding to dimension S of FIG. 3 decreases progressively and at a uniform rate from the right end of tool 57 to the leftmost pre-forming projection on the tool. The relief provided on the farthest pre-forming projection to the right preferably has the same axial length as discussed above in connection with dimension S of FIG. 3. It is currently felt desirable that the relief on the last pre-forming projection to the left, just before reaching the final shaping projections 21a and 21b, be at least as great as or approximately equal to, desirably slightly greater than, the total change in pitch produced in the nut thread, from its left end to its right end, by the progressive increase in the rate of relative axial advancement of the tool body and work piece. For example, if the pitch increases one tenth of one thousandth of an inch per turn, and there are eight turns, the total increase in pitch is eight tenths of one thousandth of an inch. The "total axial advance" for the same number of turns, as above defined, is of course much greater than this.

I claim:

1. Apparatus for forming a thread and thread groove having a predetermined varying pitch, comprising:

first threading means for producing a work piece a partially formed thread and thread groove which do not have said predetermined varying pitch; and second threading means operable by relative rotary movement, and relative axial movement at a varying rate per revolution, between the work piece and said second threading means, to progressively reshape said thread and groove;

said second threading means including one or two final thread shaping projections operable, during said relative movement of the work piece and second threading means at said varying rate of axial movement per revolution, to simultaneously engage corresponding portions of two flank surfaces at opposite sides of a portion of said partially formed thread or at opposite sides of a portion of said partially formed groove, neither of which surfaces as produced by said first threading means has said predetermined varying pitch, and to reshape said corresponding portions of both of said flank surfaces simultaneously to said predetermined varying pitch.

2. Apparatus as recited in claim 1, in which said first threading means are constructed to confine said partially formed thread groove within the axial sectional profile of the thread groove of varying pitch ultimately produced by said second threading means.

3. Apparatus as recited in claim 1, including a tool body carrying said first threading means and acting by relative rotary and axial movement between the work piece and said body to produce said partially formed thread and thread groove.

4. Apparatus as recited in claim 1, in which said one or two final thread shaping projections is or are operable by relative rotary and axial movement between said final shaping projection or projections and the work piece, at a varying rate of axial advancement per revolution, to enlarge said partially formed groove and reshape said flank surfaces to have said predetermined varying pitch.

5. Apparatus as recited in claim 1, including a tool body carrying both said first threading means and said second threading means in fixed relative positions and acting by relative rotary and axial movement between the work piece and tool body to first produce said partially formed thread and thread groove by said first threading means and then reshape said flank surfaces by said second threading means.

6. Apparatus as recited in claim 5, in which said first threading means are positioned on said body to complete production of said partially formed thread and thread groove and move beyond said work piece before said second threading means commence reshaping of said flank surfaces.

7. Apparatus as recited in claim 1, including a first tool body carrying said first threading means and acting by relative rotary and axial movement between the work piece and said body to produce said partially formed thread and thread groove, said apparatus including a second tool body carrying said second threading means and acting by subsequent relative rotary movement and simultaneous relative axial movement between said work piece and said second body with its carried second threading means, to reshape said flank surfaces to have said predetermined varying pitch.

8. Apparatus for forming a thread and thread groove having a predetermined varying pitch, comprising:
  first threading means including a tool body carrying a plurality of thread pre-forming projections operable by relative rotary and axial movement between said body with its carried projections and a work piece to produce a partially formed thread and thread groove which do not have said predetermined varying pitch; and
  second threading means for reshaping said partially formed thread and thread groove to have said predetermined varying pitch;
  said second threading means including one or two final thread shaping projections operable, during said relative movement of the work piece and second threading means at said varying rate of axial movement per revolution, to simultaneously engage corresponding portions of two flank surfaces at opposite sides of a portion of said partially formed thread or at opposite sides of a portion of said partially formed groove, neither of which surfaces as produced by said first threading means has said predetermined varying pitch, and to reshape said corresponding portions of both of said flank surfaces simultaneously to said predetermined varying pitch.

9. Apparatus as recited in claim 8, in which said second threading means are operable by relative rotary movement, and simultaneous relative axial movement at a varying rate per revolution, between the work piece and said second threading means, to reshape said partially formed thread and thread groove to have said predetermined varying pitch.

10. Apparatus as recited in claim 8, in which said one or two final thread shaping projections is or are operable by relative rotary and axial movement between said final thread shaping projection or projections and the work piece, at a varying rate of axial advancement per revolution, to reshape said partially formed thread and thread groove to have said predetermined varying pitch.

11. Apparatus as recited in claim 8, including a second tool body which carries said second threading means, said two bodies being operable sequentially to first produce said partially formed thread and groove by relative rotary and axial movement between the work piece and said first mentioned body carrying said pre-forming projections, and then reshape said thread and groove by relative rotary movement, and simultaneous relative axial movement at a varying rate per revolution, between the work piece and said second body carrying said second threading means.

12. Apparatus as recited in claim 8, in which said second threading means are carried by said tool body for movement with the tool body and with said pre-forming projections and are operable by relative rotary movement, and simultaneous relative axial movement at a varying rate per revolution, between the work piece and tool body to reshape said partially formed thread and thread groove to have said predetermined varying pitch.

13. Apparatus for forming a thread and thread groove having a predetermined varying pitch, comprising:
  a tool body;
  a plurality of pre-forming projections on said tool body for producing in a work piece by relative rotary and axial movement of the tool body and work piece a partially formed thread and thread groove which do not have said predetermined varying pitch; and
  one or two final thread shaping projections also carried by said tool body and operable by relative rotary and axial movement of said body and work piece, at a varying rate of axial advancement per revolution, to reshape said partially formed thread and groove to a form having said predetermined varying pitch;
  said one or two final thread shaping projections being operable, during said relative movement of the work piece and second threading means at said varying rate of axial movement per revolution, to simultaneously engage corresponding portions of two flank surfaces at opposite sides of a portion of said partially formed thread or at opposite sides of a portion of said partially formed groove, neither of which surfaces as produced by said first threading means has said predetermined varying pitch, and to reshape said corresponding portions of both of said flank surfaces simultaneously to said predetermined varying pitch.

14. Apparatus as recited in claim 13, in which said pre-forming projections are positioned on said body to complete production of said partially formed thread and thread groove and move beyond said work piece before said final shaping projection or projections commence reshaping of said partially formed thread and groove to said predetermined varying pitch form.

15. Apparatus as recited in claim 13, in which said pre-forming projections are relieved at at least one axial side thereof to avoid interference with the ultimate thread formed in the work piece.

16. Apparatus as recited in claim 15, in which the extent of axial relief of each of said pre-forming projections is equal to or slightly greater than the total axial shift produced in the thread in said work piece by the variation in the rate of relative axial advancement of the tool body and work piece.

17. Apparatus as recited in claim 15, in which the extent of axial relief of successive pre-forming projections decreases progressively, and the axial thickness of said pre-forming projections increases progressively, from a first pre-forming projection at one end of the pre-forming projections to a last pre-forming projection at the opposite end.

18. Apparatus as recited in claim 17, in which the extent of axial relief at a predetermined side of said first pre-forming projection is equal to or slightly greater than the total axial shift produced in the thread in said work piece by the variation in the rate of relative axial advancement of the tool body and work piece.

19. Apparatus as recited in claim 18, in which the extent of axial relief of said last pre-forming projection is equal to or slightly greater than the total change in pitch produced in the thread in said work piece by the variation in the rate of relative axial advancement of the tool body and work piece.

20. Apparatus as recited in claim 13, in which said pre-forming projections are relieved at both their leading and trailing sides to avoid interference with the ultimate thread formed in the work piece.

21. Apparatus as recited in claim 1, in which said first and second threading means include thread forming projections having cutting edges, a plurality of said projections tapering to reduced axial thicknesses circularly behind said cutting edges.

22. Apparatus as recited in claim 13, in which there are two of said final shaping projections for simultaneously engaging and shaping opposite side surfaces of said thread of varying pitch.

23. Apparatus as recited in claim 13, in which there are two of said final shaping projections for simultaneously engaging and shaping opposite side surfaces of said thread of varying pitch, said pre-forming projections having axial thicknesses less than said final shaping projections and small enough to enable said pre-forming projections to at all times remain within the axial sectional profile of the groove of varying pitch ultimately formed by said final shaping projections, said pre-forming projections being of progressively increasing cross sectional area, said pre-forming projections and said final shaping projections have cutting edges, and said pre-forming and final shaping projections tapering to reduced axial thicknesses circularly behind said cutting edges.

* * * * *